(12) United States Patent
Cariou et al.

(10) Patent No.: US 11,337,162 B1
(45) Date of Patent: May 17, 2022

(54) POWER CONTROL FOR COMMUNICATION UNDER VERY LOW POWER MODE

(71) Applicant: Intel Corporation, Santa Clara, CA (US)

(72) Inventors: Laurent Cariou, Portland, OR (US); Thomas Kenney, Portland, OR (US); Ehud Reshef, Qiryat Tivon (IL); Hassan Yaghoobi, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/109,170

(22) Filed: Dec. 2, 2020

(51) Int. Cl.
*H04W 52/20* (2009.01)
*H04W 52/24* (2009.01)
*H04W 52/36* (2009.01)

(52) U.S. Cl.
CPC ......... *H04W 52/20* (2013.01); *H04W 52/242* (2013.01); *H04W 52/245* (2013.01); *H04W 52/367* (2013.01)

(58) Field of Classification Search
CPC ............. H04W 52/0235; H04W 52/20; H04W 52/245
USPC ..................... 455/452.1, 509, 522, 69, 67.11
See application file for complete search history.

(56) References Cited

U.S. PATENT DOCUMENTS

| | | | |
|---|---|---|---|
| 2003/0112754 A1* | 6/2003 | Ramani | H04L 47/193 370/230 |
| 2009/0052426 A1* | 2/2009 | Perraud | H04W 52/20 370/338 |
| 2017/0135046 A1* | 5/2017 | Sutskover | H04W 52/343 |

* cited by examiner

*Primary Examiner* — John J Lee
(74) *Attorney, Agent, or Firm* — Law Offices of Liaoteng Wang

(57) ABSTRACT

The disclosure provides techniques for power control for communications under a Very Low Power (VLP) mode. A communication device includes: processing circuitry, to encode a message to be transmitted to a second communication device, to indicate a setpoint, wherein the setpoint is defined as a minimum power at which a packet is required to be transmitted under a set of packet parameters, such that the packet could be successfully received by the communication device; and a transceiver, to transmit the message to the second communication device, and receive the packet transmitted at a power determined based on the setpoint and a margin, from the second communication device, wherein the margin is determined based on a probability of measurement errors.

25 Claims, 12 Drawing Sheets

500 monitoring a difference between the setpoint and an actual transmitting power used by the communication device to transmit the packet to the communication device, during communication with the second communication device ⟶ 510 determining whether the difference exceeds a margin, which is determined based on a probability of measurement errors ⟶ 520 terminating the communication between the communication device and the second communication device, when the difference exceeds the margin for more than a particular number of packets ⟶ 530

FIG. 5

POWER CONTROL FOR COMMUNICATION UNDER VERY LOW POWER MODE

TECHNICAL FIELD

Embodiments described herein generally relate to wireless communication, and more specifically to power control for communications under a Very Low Power (VLP) mode.

BACKGROUND

Many regulatory bodies, such as, Federal Communications Commission (FCC), European Telecommunications Standards Institute (ETSI) etc., are now allowing unlicensed use in the 6 GHz band. Since there are licensed operators (which may be called "incumbents") in the 6 GHz band, several rules have been put in place to minimize interferences of unlicensed devices on those incumbents. Specifically, FCC has allowed a mode called Low Power Indoor (LPI) and another mode called Standard Power (SP), each of which require different features to be implemented or power limits to be respected However, the VLP mode is still under debate. The VLP mode would have a significantly reduced maximum transmit power, but would allow any devices in any locations to operate under this mode in the 6 GHz band. This would allow point-to-point (P2P) or mobile access point (AP) operations, for example, which are currently forbidden under the LPI or SP modes.

BRIEF DESCRIPTION OF THE DRAWINGS

The various advantages of the embodiments will become apparent to one skilled in the art by reading the following specification and appended claims, and by referencing the following drawings, in which:

FIG. 5 is a flowchart showing a further method performed by the communication device operating under the VLP mode according to embodiments of the disclosure;

DETAILED DESCRIPTION

Various aspects of the illustrative embodiments will be described using terms commonly employed by those skilled in the art to convey the substance of the disclosure to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well-known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrases "in an embodiment" "in one embodiment" and "in some embodiments" are used repeatedly herein. The phrase generally does not refer to the same embodiment; however, it may. The terms "comprising," "having," and "including" are synonymous, unless the context indicates otherwise. The phrases "A or B" and "A/B" mean "(A), (B), or (A and B)."

VLP operations in the 6 GHz band would have a broad prospect, since VLP devices with high bandwidth and low latency are ideal for enabling a vast array of applications. From education to home entertainment and from telemedicine with point-of-care equipment to augmented reality (AR) glasses to assist in a surgery, low power portable devices can be a significant source of data generation and consumption. This is even truer when portability is combined with high bandwidth and low latency. Ubiquitous ecosystem around 6 GHz will permit mixing and matching of equipment for use-cases not even imagined today. ABI Research has projected 73% compounded annual growth rate (CAGR) just for AR use cases spread across nearly every vertical industry.

In order to allow the VLP operations in the 6 GHz band, transmitting power of VLP devices is one of the major concerns for the regulatory body, such as, FCC. Embodiments of the present application provides techniques for power control for communications under the VLP mode. The description herein is dedicated to the Institute of Electrical and Electronic Engineers (IEEE) 802.11 family, for example, 802.11ax (which is also called High-Efficiency Wireless (HEW) or Wireless Fidelity (Wi-Fi) 6), 802.11ac (which is also called 5th Generation of Wi-Fi (5G Wi-Fi)), and 802.11be, etc., but other technologies should be able to apply the same general concepts.

Figure 1:
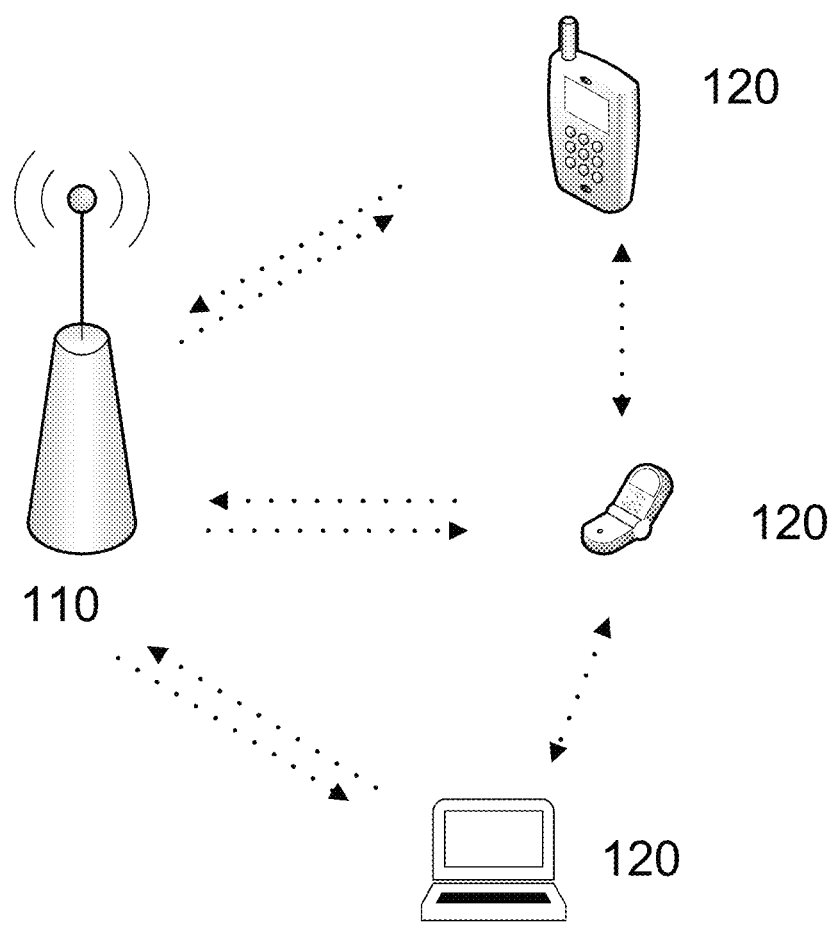
FIG. 1 shows example scenarios of devices communicating under the Very Low Power (VLP) mode, according to embodiments of the disclosure.

FIG. 1 shows example scenarios of devices communicating under the VLP mode. A large category of devices may operate under the VLP mode in the 6 Hz band, so as to offload traffic from the cellular communication network, such as, the fourth generation (4G) network or fifth generation (5G) network, to Wi-Fi.

As shown in FIG. 1, a wireless network 100 may include one or more access points (APs) 110 and one or more stations (STAs) 120, which may communicate in accordance with IEEE 802.11 communication standards. The STAs 120 may be mobile devices that are non-stationary (e.g., not having fixed locations) or may be stationary devices. In some embodiments, the APs 110 and STAs 120 may include one or more function modules similar to those in the functional diagram of FIG. 7 and/or the example machine/system of FIG. 8.

For example, as shown in FIG. 1, in a Basic Service Set (BSS) scenario, both APs 110 and associated STAs 120 can operate under the VLP mode.

As another example, as also shown in FIG. 1, in a point-to-point (P2P) scenario, all the STA(s) 120 can operate under the VLP mode.

In order to minimize the interferences on the incumbents of the 6 Hz band, all the devices operating under the VLP mode, including the APs 110 and STAs 120, should communicate at a limited power. All the devices are required to utilize a transmitting power which is above a setpoint by a quantity not larger than a margin, as detailed in the proposal herein.

In an embodiment, a uplink transmission of one of the STAs 120 to its associated AP 110 is taken as an example to illustrate the power control process for the VLP operation. The STA 120 initiating the uplink transmission may have knowledge of its sensitivity for a particular set of packet parameters. The STA 120, when initiating the uplink transmission, may advise the AP 110 of its setpoint for the particular set of packet parameters, by signaling/feedback. For example, the STA 120 may transmit a message to the AP 110, to indicate the setpoint. The setpoint may be defined as, for example, a minimum power at which a packet is required to be transmitted under a set of packet parameters, such that the packet could be successfully received by the STA 120.

In an embodiment, the set of packet parameters may include a Modulation and Coding Scheme (MCS) and a bandwidth (BW). In other embodiments, the set of packet parameters may include other parameters, such as, a number of spatial streams (SS) etc.

The message may take a form of a table of a setpoint as a function of, at least, the MCS and BW. Just as an example, Table 1 shows a possible form of the table. Please note that the example of Table 1 is to be regarded as illustrative instead of limiting. As shown, the packet parameters may include the MCS, SS and BW, and the setpoint may indicate by the minimum Received Signal Strength Indication (RSSI). Please note that the setpoint may also be indicated by indicators, such as, a Signal Noise Ratio (SNR), or a carrier to interference ratio (C/I), and so forth. When the Packet Parameters are set as MCS12, SS1, BW 20 megahertz (MHz), the min RSSI for receiving the packet should be −55 decibels relative to one milliwatt (dBm), for example.

TABLE 1

| Packet Parameters | min RSSI |
| --- | --- |
| MCS12, SS1, BW 20 MHz | −55 dBm |
| MCS12, SS2, BW 80 MHz | −50 dBm |
| . . . | . . . |

The associated AP 110, after receiving the message, may decode the message to obtain the setpoint. The AP 110 may then determine a power to be used to transmit the packet to the STA 120, based on the setpoint and the margin. The term "margin" used herein means a particular amount (extra power) above a specific threshold, for example, the setpoint. The margin may be determined based on a probability of measurement errors, and would help to improve the probability of measurement errors. For example, the margin may be defined in the standards (such as, the 802.11 standards), so that each communication device would know the margin. As an example, the margin may be in an order of 1 to 5 dB. The margin may also be any suitable amount, which is not limited herein.

In an embodiment, the AP 110 may determine that the power is above the setpoint by a quantity not larger than the margin, for example. In the embodiment, the power should be larger than the setpoint, so as to assure that the STA 120 may receive the packet successfully; and a difference between the power and the setpoint should not exceed the margin, so as not to interfere the incumbents of the 6 Hz band.

The AP 110 may use the power as determined to transmit the required packet to the STA 120. The STA 120 may then receive the packet successfully.

During exchanges under the VLP, the power used by the AP 110 to transmit one or more frames to the STA 120, may be refined based on configuration, measurement errors and channel changes, after the initial exchange as described above. The refinement of the power would be discussed below.

Though described based on the UL transmission from the STA 120 to the AP 110, the above descriptions may be equally applied to a downlink (DL) transmission from an AP to one of the STAs connected to the AP. Also, for the P2P scenario, the above descriptions may be equally applied to both directions between two communication devices, such as, the STAs 120 as shown in FIG. 1.

It should be noted that the approach provided herein is only applicable for unicast frames, other than broadcast frames, in both the BSS scenario and the P2P scenario.

As mentioned above, the setpoint may be indicated by indicators, such as, a SNR, a C/I, or RSSI. As a result, channel information, such as, a path loss between the STA 120 and the associated AP 110 should also be exchanged during the communication. Several approaches are provided below to exchange the path loss.

As a first approach, for the UL transmission from the STA 120 to the AP 110, the STA 120 may encode a frame to be transmitted to the AP 110, to include a power at which the frame is to be transmitted, and thus the AP 110 may estimate the path loss based on the power as indicated by the frame itself and the RSSI for the frame; or for the DL transmission from the AP 110 to the STA 120, the AP 110 may encode a frame to be transmitted to the STA 120, to include a power at which the frame is to be transmitted, and thus the STA 120 may estimate the path loss based on the power as indicated by the frame itself and the RSSI for the frame; or for the P2P communication, a first STA may encode a frame to be transmitted to a second STA, to include a power at which the frame is to be transmitted, and thus the second STA may estimate the path loss based on the power as indicated by the frame itself and the RSSI for the frame, and vice versa.

In an embodiment, only some particular fames may be used to act as the frame used in the first approach. For example, only frames, such as, beacons, probe response, Fast Initial Link Setup Discovery Frames (FILS DFs) or management frames, may be used for the DL transmission; while any other frames may be used for the UL transmission.

In another embodiment, all fames (including data frames) may be used to act as the frame used in the first approach. This may be done by including a new A-Control variant in a High Throughput (HT) control field of an MAC header, or aggregating frames to be transmitted as a new frame that contains this information.

In another embodiment, a Block Acknowledgement (BlockAck) frame may be modified to include a field to indicate information about the a power at which the Block-Ack frame is to be transmitted.

As a second approach, the path loss will likely be considered identical in both directions (assuming reciprocity), either for the BSS scenario or the P2P scenario, and therefore an estimation of the path loss is done in one direction and the estimation can be shared through signaling, so that both sides of a link can use the same path loss.

For the example scenarios of FIG. 1, in an embodiment, each of the STA(s) 120 and the AP(s) 110 may have knowledge of its receiving performance for each set of packet parameters, such as, the MAC and BW etc. For example, each of the STA(s) 120 and the AP(s) 110 may have information about a set of operating points, each of which corresponding to one set of packet parameters, such as, the MAC and BW etc., stored in its memory. For example, the operating point may be fixed to be on an order of 1% to 10% Packet Error Rate (PER). For Example, the information about the set of operating points may take a form of a table of packet parameters (such as, the MAC, BW etc.) versus receiving performance (such as, the SNR, C/I, or RSSI etc.), like that shown in Table 1. Each of the STA(s) 120 and the AP(s) 110, when acting as a receiving party, may provide the information about the set of operating points to the corresponding transmitting party.

In embodiments, since transmissions from the transmitting party to the receiving party are not continuous, the setpoint would not be always suitable for the subsequent transmissions, i.e., the setpoint may have errors, due to any changes in the channel and environment for the transmissions. Thus, the setpoint need to be updated or refined during subsequent exchanges.

As a first approach for updating/refining the setpoint, after the initial setpoint has been transmitted from the receiving party to the transmitting party, and the transmitting party has transmitted the required packet at the power based on the setpoint and the margin, the setpoint may be updated or refined during exchanges between the receiving party and the transmitting party. For example, the update or the refinement may happen in one frame every x ms or at every opportunity, such as, in a BlockAck frame in response to frame transmissions, or in A-control field, or through an aggregated frame along with useful data/management frames. Because of the measurement errors, in addition to channel fluctuations, the above-mentioned margin should be defined in the standards. The transmitting party may then determine the required power to transmit each of the subsequent packets, based on the initial setpoint, along with any update or refinement, and the margin, in order to attain the desired operating point at the receiving party.

As a second approach for updating/refining the setpoint, after the initial setpoint has been transmitted from the receiving party to the transmitting party, and the transmitting party has transmitted the required packet at the power based on the setpoint and the margin, the receiving party may update or refine the setpoint during subsequent exchanges, according to any changes in the channel and environment for the transmissions, and then encode in a frame that it transmits to the transmitting party, to include the updated or refined setpoint. The updated or refined setpoint would indicate a difference between the RSSI (or SNR or C/I) and the target RSSI (SNR or C/I) that would be needed to meet the minimum sensitivity for the packet configuration, for example. As an example, the updated or refined setpoint may be included in the Power Headroom A-control field in HT control already defined for 802.11ax, along with an indication to indicate that the information is for the regulatory operation with VLP. The indication may be implemented by reserved bits in the Power headroom A-control field. As another example, the updated or refined setpoint may be included in a BlockAck frame, by using reserved bits, or alternatively, defining a new field with a multi-STA blockAck frame. For example, a per-STA BA information field in the multi-STA blockAck frame may be repurposed to carry feedback parameters, including the updated or refined setpoint. As in the first approach, the margin should also be defined. The transmitting party may then determine the required power to transmit each of the subsequent packets, based on the updated/refined setpoint and the margin. This approach may provide successful operation while minimizing changes in the existing standards.

For both the first approach and the second approach for updating/refining the setpoint, in embodiments, both the receiving party and the transmitting party may monitor whether a difference between a particular operating point and an actual transmitting power used by the transmitting party exceeds the margin, and if the difference exceeds the margin for more than a number of packets (for example, 20-50, or any appropriate number), packet exchanges between the receiving party and the transmitting party would be terminated. After a preset timer expires, the two parties may attempt to establish the link again.

Figure 2:
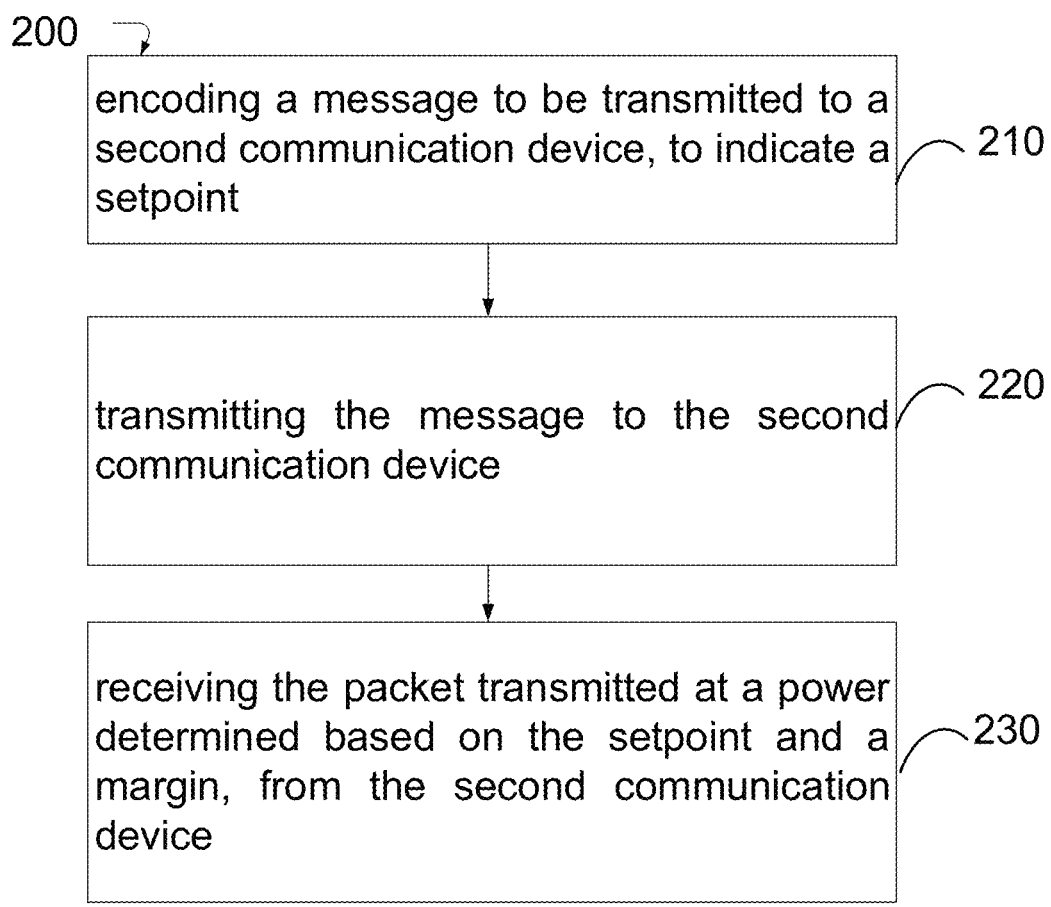
FIG. 2 is a flowchart showing a method performed by a communication device operating under the VLP mode according to embodiments of the disclosure.

FIG. 2 is a flowchart showing a method 200 performed by a communication device operating under the VLP mode according to embodiments of the disclosure. The method 200 may be implemented by any of the AP(s) 110 and STA(s) 120 described herein with reference to FIG. 1.

As illustrated in FIG. 2, processing block 210 of method 200 provides for encoding a message to be transmitted to a second communication device, to indicate a setpoint. The second communication device may also be any of the AP(s) 110 and STA(s) 120 described herein with reference to FIG. 1. The setpoint is defined as a minimum power at which a packet is required to be transmitted from the second communication device to the communication device, under a set of packet parameters (such as, the MCS and BW), such that the packet could be successfully received by the communication device.

Processing block 220 of method 200 provides for transmitting the message to the second communication device. Processing block 230 of method 200 provides for receiving the packet transmitted at a power determined based on the setpoint and a margin, from the second communication device. As mentioned above, the margin may be determined based on a probability of measurement errors.

Figure 3:
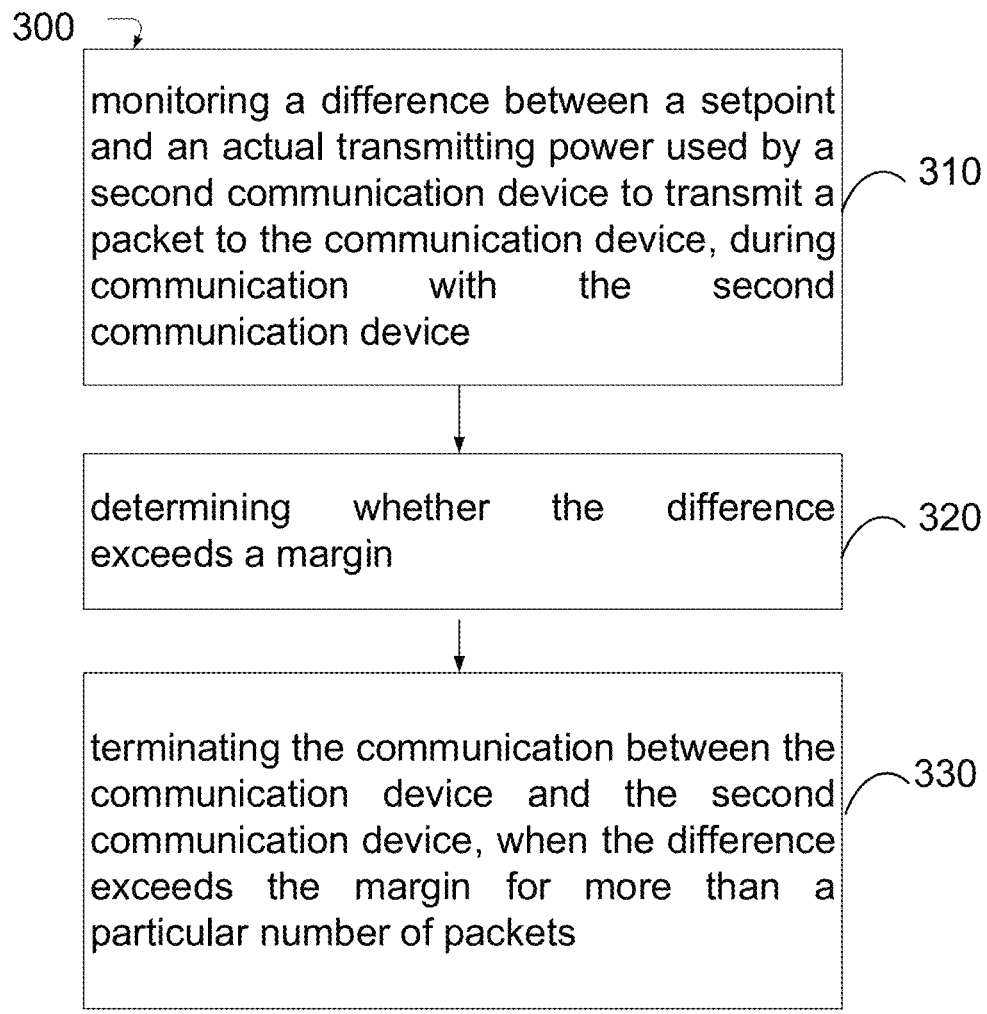
FIG. 3 is a flowchart showing another method performed by a communication device operating under the VLP mode according to embodiments of the disclosure.

FIG. 3 is a flowchart showing another method 300 performed by a communication device operating under the VLP mode according to embodiments of the disclosure. The method 300 may be implemented by any of the AP(s) 110 and STA(s) 120 described herein with reference to FIG. 1.

As illustrated in FIG. 3, processing block 310 of method 300 provides for monitoring a difference between a setpoint and an actual transmitting power used by a second communication device to transmit a packet to the communication device, during communication with the second communication device. The second communication device may also be any of the AP(s) 110 and STA(s) 120 described herein with reference to FIG. 1. The setpoint is defined as a minimum power at which a packet is required to be transmitted from the second communication device to the communication device, under a set of packet parameters (such as, the MCS and BW), such that the packet could be successfully received by the communication device.

Processing block 320 of method 300 provides for determining whether the difference exceeds a margin, which is determined based on a probability of measurement errors. Processing block 330 of method 300 provides for terminating the communication between the communication device and the second communication device, when the difference exceeds the margin for more than a particular number of packets.

Figure 4:
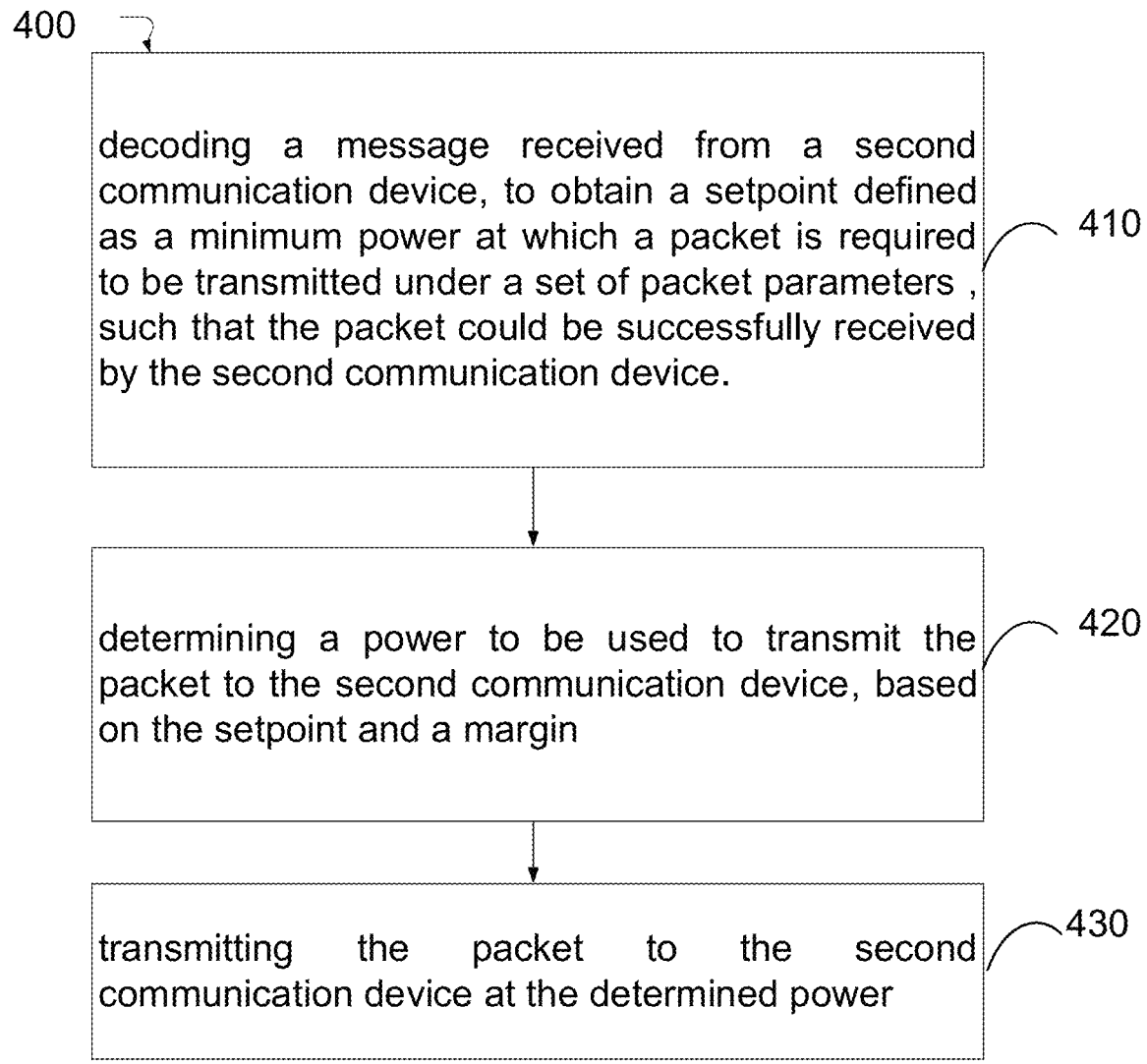
FIG. 4 is a flowchart showing another method performed by a communication device operating under the VLP mode according to embodiments of the disclosure.

FIG. 4 is a flowchart showing another method 400 performed by a communication device operating under the VLP mode according to embodiments of the disclosure. The method 400 may be implemented by any of the AP(s) 110 and STA(s) 120 described herein with reference to FIG. 1.

As illustrated in FIG. 4, processing block 410 of method 400 provides for decoding a message received from a second communication device, to obtain a setpoint defined as a minimum power at which a packet is required to be transmitted under a set of packet parameters (such as, the MCS and BW), such that the packet could be successfully received by the second communication device. The second communication device may also be any of the AP(s) 110 and STA(s) 120 described herein with reference to FIG. 1.

Processing block 420 of method 400 provides for determining a power to be used to transmit the packet to the second communication device, based on the setpoint and a margin. As mentioned above, the margin may be determined based on a probability of measurement errors. Processing block 430 of method 400 provides for transmitting the packet to the second communication device at the determined power.

Further to method 400 of FIG. 4, FIG. 5 is a flowchart showing a further method 500 performed by the communication device operating under the VLP mode according to embodiments of the disclosure.

As illustrated in FIG. 5, processing block 510 of method 500 provides for monitoring a difference between the setpoint and an actual transmitting power used by the communication device to transmit the packet to the communication device, during communication with the second communication device. Processing block 520 of method 500 provides for determining whether the difference exceeds a margin, which is determined based on a probability of measurement errors. Processing block 530 of method 500 provides for terminating the communication between the communication device and the second communication device, when the difference exceeds the margin for more than a particular number of packets.

Figure 6:
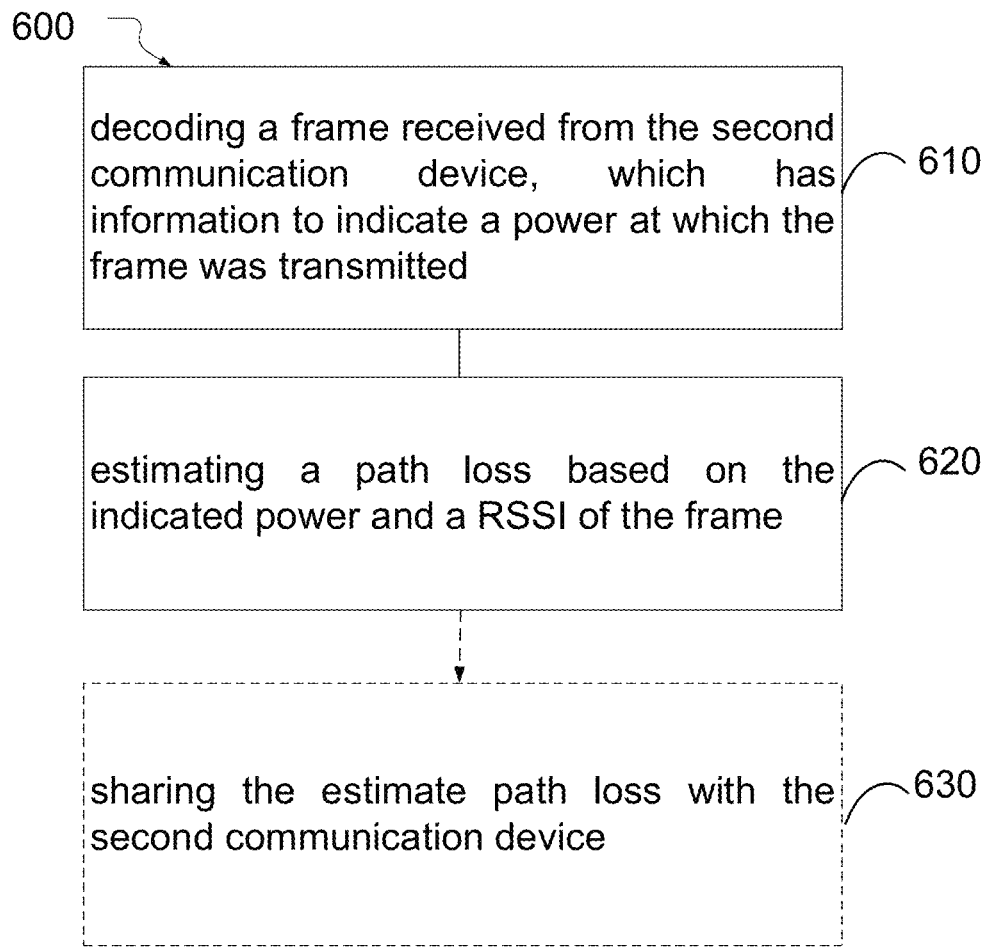
FIG. 6 is a flowchart showing a further method performed by the communication device operating under the VLP mode according to embodiments of the disclosure.

Further to method 400 of FIG. 4, FIG. 6 is a flowchart showing a further method 600 performed by the communication device operating under the VLP mode according to embodiments of the disclosure.

As illustrated in FIG. 6, processing block 610 of method 600 provides for decoding a frame received from the second communication device, which has information to indicate a power at which the frame was transmitted. Processing block 620 of method 600 provides for estimating a path loss based on the indicated power and a RSSI of the frame. Optionally, method 600 may further includes a processing block 630, which provides for sharing the estimate path loss with the second communication device.

More particularly, each of the method 200 of FIG. 2, method 300 of FIG. 3, method 400 of FIG. 4, method 500 of FIG. 5, and method 600 of FIG. 6 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in each of the method 200 of FIG. 2, method 300 of FIG. 3, method 400 of FIG. 4, method 500 of FIG. 5, and method 600 of FIG. 6 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 7:
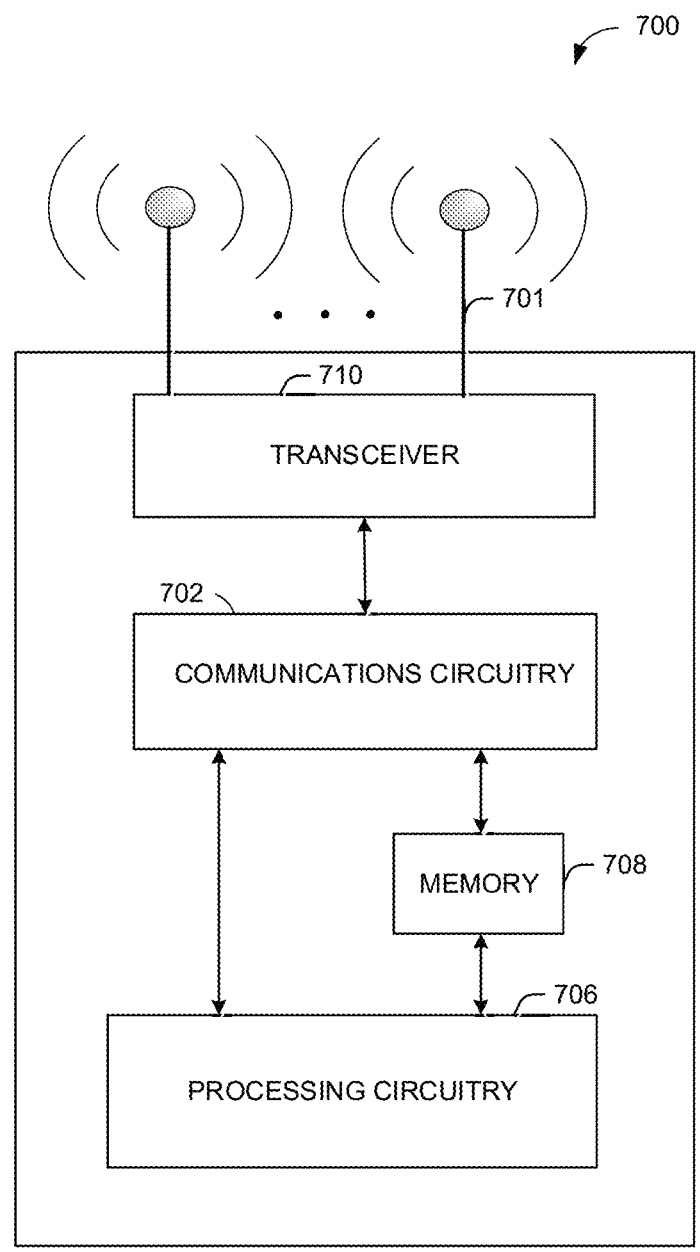
FIG. 7 shows a functional diagram of an exemplary communication device, according to embodiments of the disclosure.

FIG. 7 shows a functional diagram of an exemplary communication device 700, in accordance with one or more example embodiments of the disclosure. In one embodiment, FIG. 7 illustrates a functional block diagram of a communication device that may be suitable for use as the AP(s) 110 (FIG. 1) or the STA(S) 120 (FIG. 1) in accordance with some embodiments. The communication device 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication device 700 may include communications circuitry 702 and a transceiver 710 for transmitting and receiving signals to and from other communication stations using one or more antennas 701. The communications circuitry 702 may include circuitry that can operate the physical layer (PHY) communications and/or medium access control (MAC) communications for controlling access to the wireless medium, and/or any other communications layers for transmitting and receiving signals. The communication device 700 may also include processing circuitry 706 and memory 708 arranged to perform the operations described herein. In some embodiments, the communications circuitry 702 and the processing circuitry 706 may be configured to perform operations detailed in the above figures, diagrams, and flows.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication device 700 may include one or more processors. In other embodiments, two or more antennas 701 may be coupled to the communications circuitry 702 arranged for transmitting and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication device 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication device 700 may include one or more of a keyboard, a display, a non-volatile memory port, multiple antennas, a graphics processor, an application processor, speakers, and other mobile device elements. The display may be a liquid crystal display (LCD) screen including a touch screen.

Although the communication device 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication device 700 may include one or more processors and may be configured with instructions stored on a computer-readable storage device.

Figure 8:
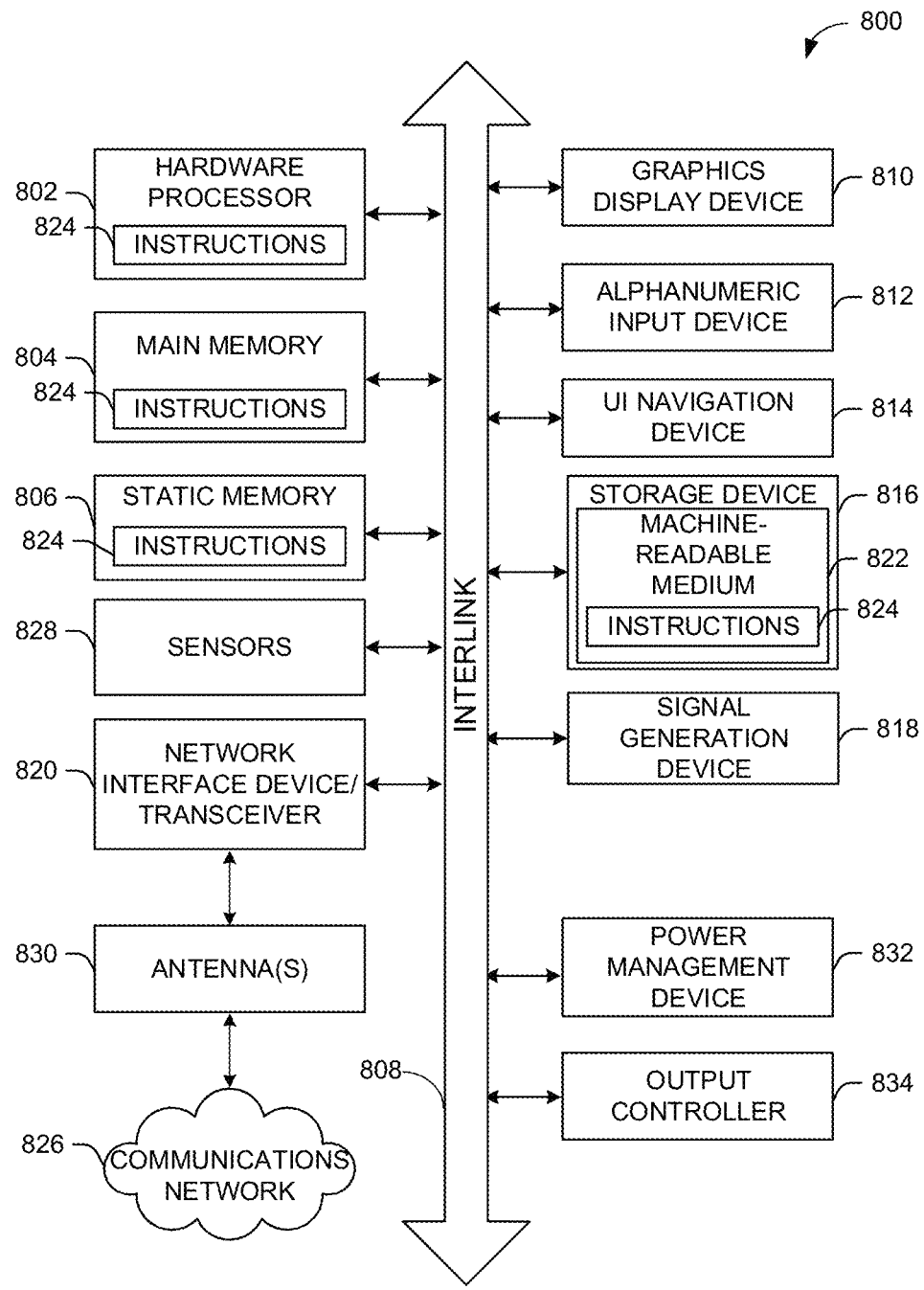
FIG. 8 shows a block diagram of an example of a machine or system upon which any one or more of the techniques discussed herein may be performed.

FIG. 8 illustrates a block diagram of an example of a machine 800 upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the disclosure may be carried out by a baseband processor. The baseband processor may be configured to generate corresponding baseband signals. The baseband processor may further include physical layer (PHY) and medium access control layer (MAC) circuitry, and may further interface with the hardware processor 802 for generation and processing of the baseband signals and for controlling operations of the main memory 804, and/or the storage device 816. The baseband processor may be provided on a single radio card, a single chip, or an integrated circuit (IC).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The instructions may implement one or more aspects of the methods/processes described above, including the method 200 of FIG. 2, method 300 of FIG. 3, method 400 of FIG. 4, method 500 of FIG. 5, and method 600 of FIG. 6 as described herein.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 9:
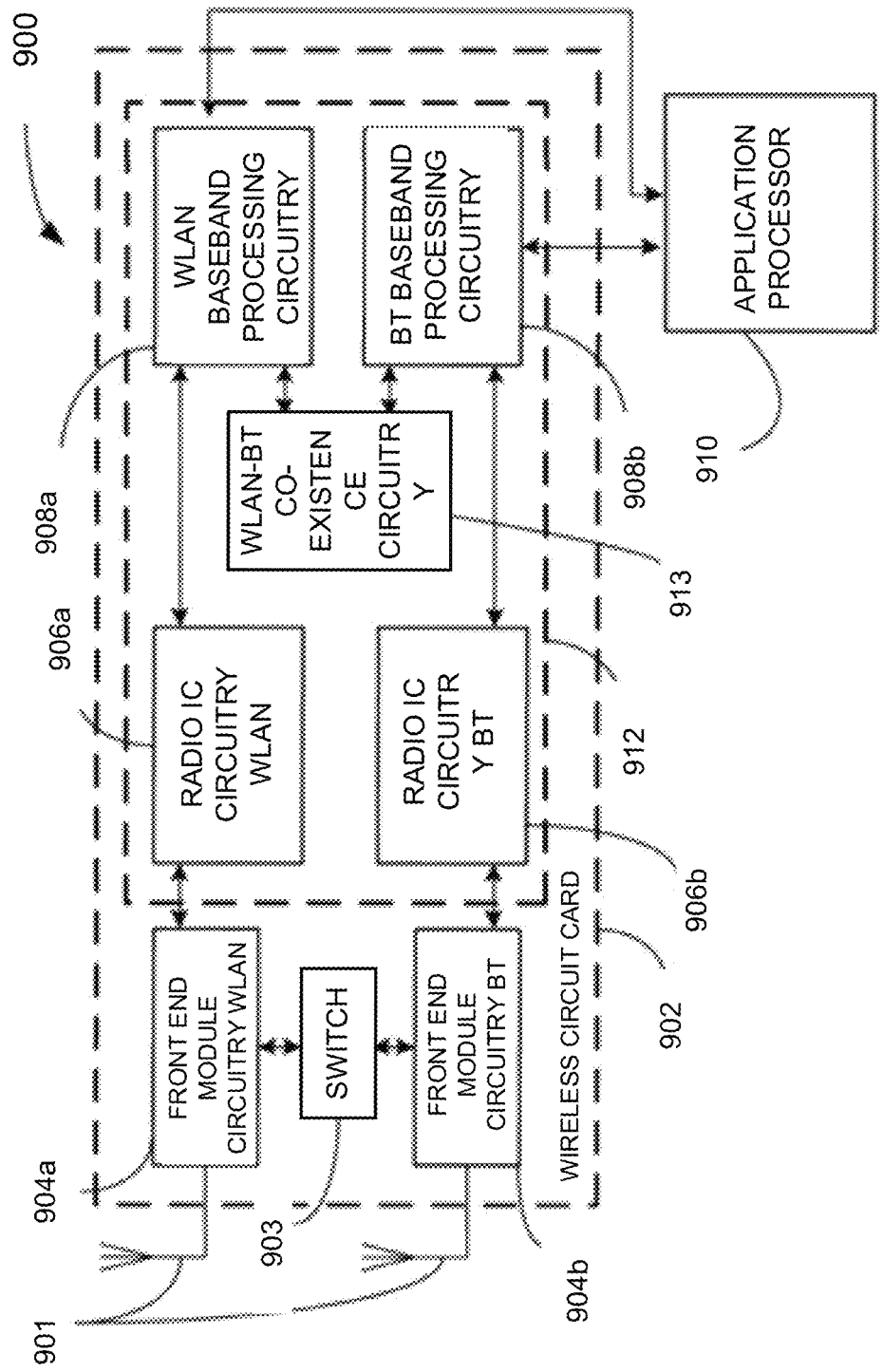
FIG. 9 is a block diagram of a radio architecture, according to embodiments of the disclosure.

FIG. 9 is a block diagram of a radio architecture 900 in accordance with some embodiments. The radio architecture 900 may be implemented in any of the AP(s) 110 and/or STA(s) 120 of FIG. 1. Radio architecture 900 may include radio front-end module (FEM) circuitry 904a-b, radio IC circuitry 906a-b and baseband processing circuitry 908a-b. Radio architecture 900 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 904a-b may include a WLAN or Wi-Fi FEM circuitry 904a and a Bluetooth (BT) FEM circuitry 904b. The WLAN FEM circuitry 904a may include a receive signal path comprising circuitry configured to operate on WLAN RF signals received from one or more antennas 901, to amplify the received signals and to provide the amplified versions of the received signals to the WLAN radio IC circuitry 906a for further processing. The BT FEM circuitry 904b may include a receive signal path which may include circuitry configured to operate on BT RF signals received from one or more antennas 901, to amplify the received signals and to provide the amplified versions of the received signals to the BT radio IC circuitry 906b for further processing. FEM circuitry 904a may also include a transmit signal path which may include circuitry configured to amplify WLAN signals provided by the radio IC circuitry 906a for wireless transmission by one or more of the antennas 901. In addition, FEM circuitry 904b may also include a transmit signal path which may include circuitry configured to amplify BT signals provided by the radio IC circuitry 906b for wireless transmission by the one or more antennas. In the embodiment of FIG. 9, although FEM 904a and FEM 904b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 906a-b as shown may include WLAN radio IC circuitry 906a and BT radio IC circuitry 906b. The WLAN radio IC circuitry 906a may include a receive signal path which may include circuitry to down-convert WLAN RF signals received from the FEM circuitry 904a and provide baseband signals to WLAN baseband processing circuitry 908a. BT radio IC circuitry 906b may in turn include a receive signal path which may include circuitry to down-convert BT RF signals received from the FEM circuitry 904b and provide baseband signals to BT baseband processing circuitry 908b. WLAN radio IC circuitry 906a may also include a transmit signal path which may include circuitry to up-convert WLAN baseband signals provided by the WLAN baseband processing circuitry 908a and provide WLAN RF output signals to the FEM circuitry 904a for subsequent wireless transmission by the one or more antennas 901. BT radio IC circuitry 906b may also include a transmit signal path which may include circuitry to up-convert BT baseband signals provided by the BT baseband processing circuitry 908b and provide BT RF output signals to the FEM circuitry 904b for subsequent wireless transmission by the one or more antennas 901. In the embodiment of FIG. 9, although radio IC circuitries 906a and 906b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 908a-b may include a WLAN baseband processing circuitry 908a and a BT baseband processing circuitry 908b. The WLAN baseband processing circuitry 908a may include a memory, such as, for example, a set of RAM arrays in a Fast Fourier Transform or Inverse Fast Fourier Transform block (not shown) of the WLAN baseband processing circuitry 908a. Each of the WLAN baseband circuitry 908a and the BT baseb and circuitry 908b may further include one or more processors and control logic to process the signals received from the corresponding WLAN or BT receive signal path of the radio IC circuitry 906a-b, and to also generate corresponding WLAN or BT baseband signals for the transmit signal path of the radio IC circuitry 906a-b. Each of the baseband processing circuitries 908a and 908b may further include physical layer (PHY) and medium access control layer (MAC) circuitry, and may further interface with a device for generation and processing of the baseband signals and for controlling operations of the radio IC circuitry 906a-b.

Referring still to FIG. 9, according to the shown embodiment, WLAN-BT coexistence circuitry 913 may include logic providing an interface between the WLAN baseband circuitry 908a and the BT baseband circuitry 908b to enable use cases requiring WLAN and BT coexistence. In addition, a switch 903 may be provided between the WLAN FEM circuitry 904a and the BT FEM circuitry 904b to allow switching between the WLAN and BT radios according to application needs. In addition, although the antennas 901 are depicted as being respectively connected to the WLAN FEM circuitry 904a and the BT FEM circuitry 904b, embodiments include within their scope the sharing of one or more antennas as between the WLAN and BT FEMs, or the provision of more than one antenna connected to each of FEM 904a or 904b.

In some embodiments, the front-end module circuitry 904a-b, the radio IC circuitry 906a-b, and baseband processing circuitry 908a-b may be provided on a single radio card, such as wireless radio card 9. In some other embodiments, the one or more antennas 901, the FEM circuitry 904a-b and the radio IC circuitry 906a-b may be provided on a single radio card. In some other embodiments, the radio IC circuitry 906a-b and the baseband processing circuitry 908a-b may be provided on a single chip or integrated circuit (IC), such as IC 912

In some embodiments, the wireless radio card 902 may include a WLAN radio card and may be configured for Wi-Fi communications, although the scope of the embodiments is not limited in this respect. In some of these embodiments, the radio architecture 900 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 900 may be part of a Wi-Fi communication station (STA) such as a wireless access point (AP), a base station or a mobile device including a Wi-Fi device. In some of these embodiments, radio architecture 900 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 900 may also be suitable to transmit and/or receive communications in accordance with other techniques and standards.

In some embodiments, the radio architecture 900 may be configured for high-efficiency Wi-Fi (HEW) communications in accordance with the IEEE 802.11ax standard. In these embodiments, the radio architecture 900 may be configured to communicate in accordance with an OFDMA technique, although the scope of the embodiments is not limited in this respect.

In some other embodiments, the radio architecture 900 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 9, the BT baseband circuitry 908b may be compliant with a Bluetooth (BT) connectivity standard such as Bluetooth, Bluetooth 8.0 or Bluetooth 6.0, or any other iteration of the Bluetooth Standard.

In some embodiments, the radio architecture 900 may include other radio cards, such as a cellular radio card configured for cellular (e.g., 3GPP such as LTE, LTE-Advanced or 5G communications).

In some IEEE 802.11 embodiments, the radio architecture 900 may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 10:
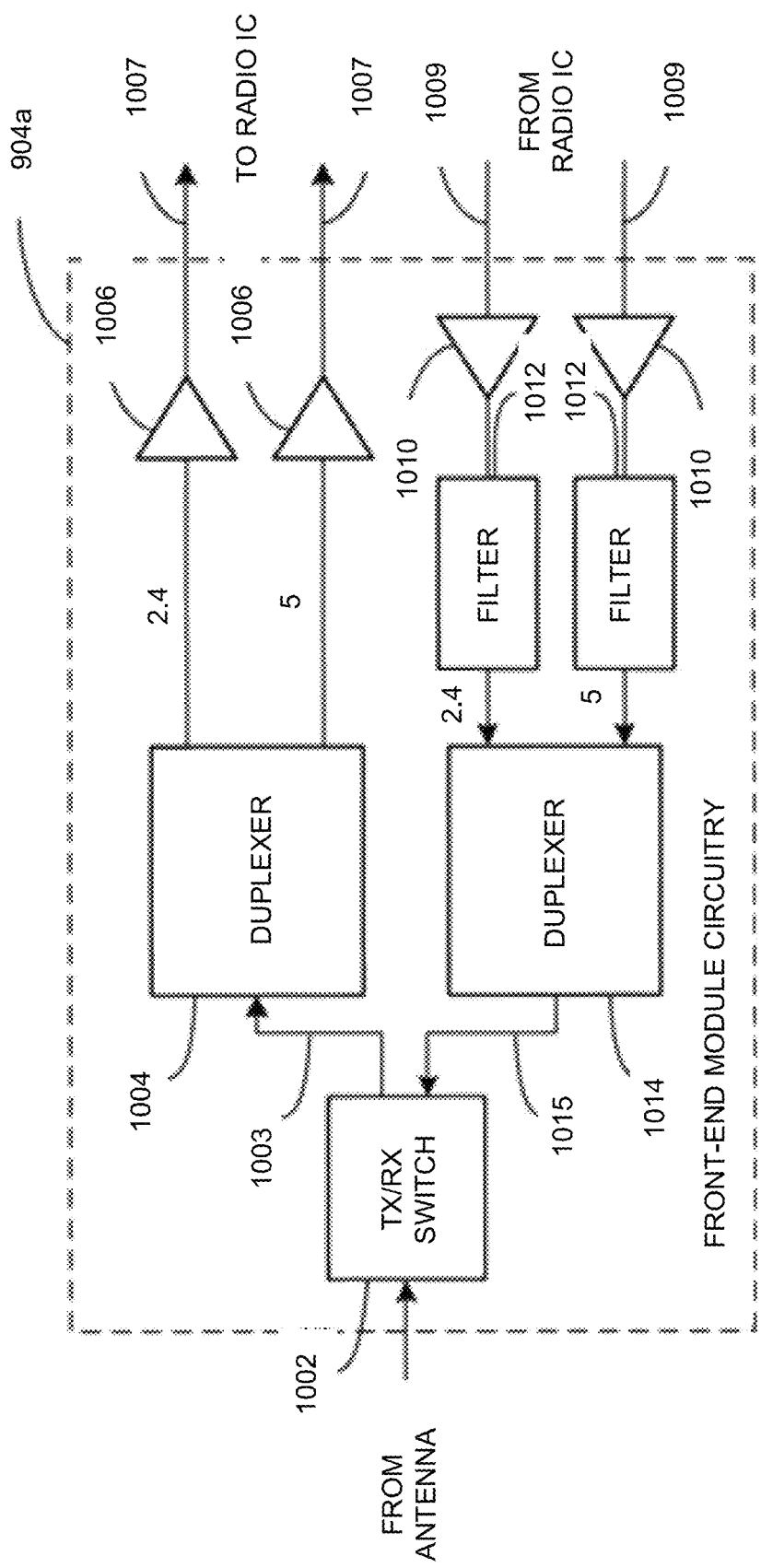
FIG. 10 is a functional block diagram illustrating the WLAN FEM circuitry of FIG. 9.

FIG. 10 illustrates WLAN FEM circuitry 904a in accordance with some embodiments. Although the example of FIG. 10 is described in conjunction with the WLAN FEM circuitry 904a, the example of FIG. 10 may be described in conjunction with the example BT FEM circuitry 904b (FIG. 9), although other circuitry configurations may also be suitable.

In some embodiments, the FEM circuitry 904a may include a TX/RX switch 1002 to switch between transmit mode and receive mode operation. The FEM circuitry 904a may include a receive signal path and a transmit signal path. The receive signal path of the FEM circuitry 904a may include a low-noise amplifier (LNA) 1006 to amplify received RF signals 1003 and provide the amplified received RF signals 1007 as an output (e.g., to the radio IC circuitry 906a-b (FIG. 9)). The transmit signal path of the circuitry 904a may include a power amplifier (PA) to amplify input RF signals 1009 (e.g., provided by the radio IC circuitry 906a-b), and one or more filters 1012, such as band-pass filters (BPFs), low-pass filters (LPFs) or other types of filters, to generate RF signals 1015 for subsequent transmission (e.g., by one or more of the antennas 901 (FIG. 9)) via an example duplexer 1014.

In some dual-mode embodiments for Wi-Fi communication, the FEM circuitry 904a may be configured to operate in either the 2.4 GHz frequency spectrum or the 5 GHz frequency spectrum. In these embodiments, the receive signal path of the FEM circuitry 904a may include a receive signal path duplexer 1004 to separate the signals from each spectrum as well as provide a separate LNA 1006 for each spectrum as shown. In these embodiments, the transmit signal path of the FEM circuitry 904a may also include a power amplifier 1010 and a filter 1012, such as a BPF, an LPF or another type of filter for each frequency spectrum and a transmit signal path duplexer 1004 to provide the signals of one of the different spectrums onto a single transmit path for subsequent transmission by the one or more of the antennas 901 (FIG. 9). In some embodiments, BT communications may utilize the 2.4 GHz signal paths and may utilize the same FEM circuitry 904a as the one used for WLAN communications.

Figure 11:
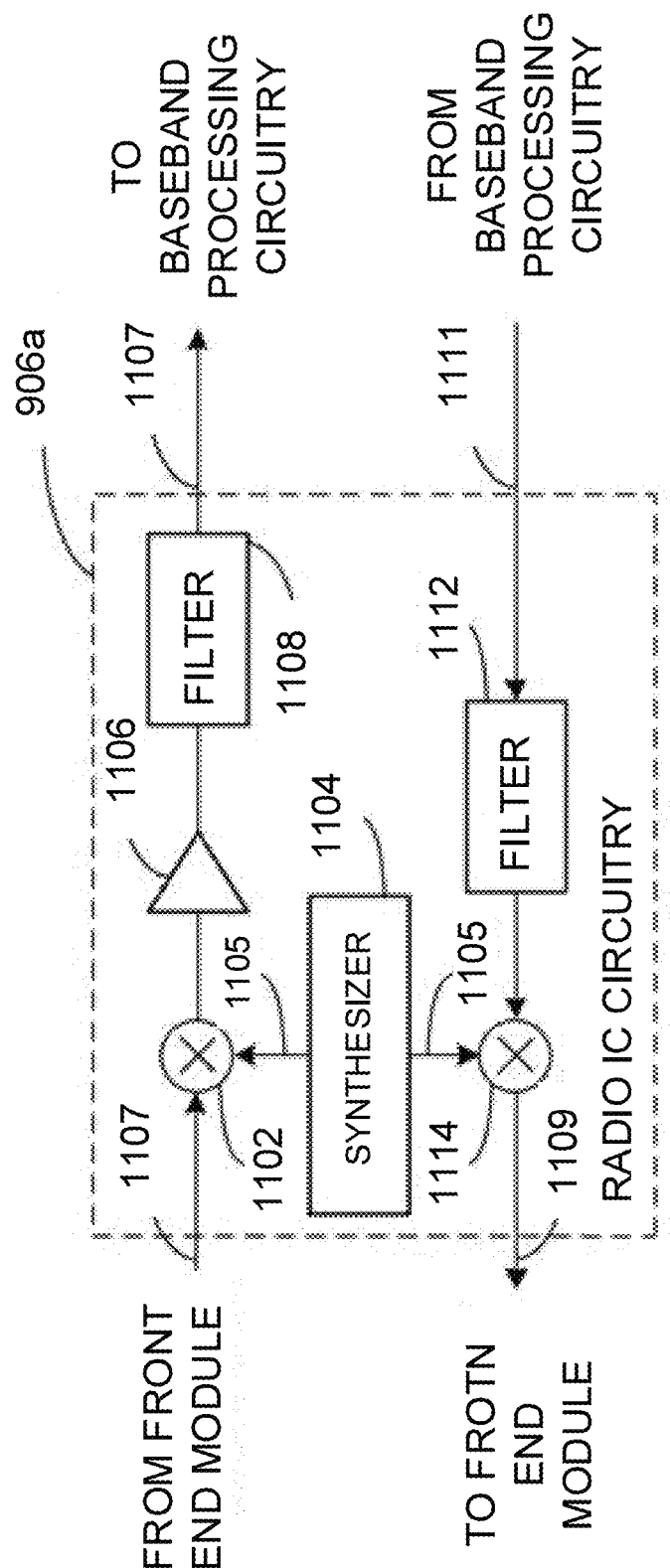
FIG. 11 is a functional block diagram illustrating the radio IC circuitry of FIG. 9.

FIG. 11 illustrates radio IC circuitry 906a in accordance with some embodiments. The radio IC circuitry 906a is one example of circuitry that may be suitable for use as the WLAN or BT radio IC circuitry 906a/906b (FIG. 9), although other circuitry configurations may also be suitable.

Alternatively, the example of FIG. 11 may be described in conjunction with the example BT radio IC circuitry 906b.

In some embodiments, the radio IC circuitry 906a may include a receive signal path and a transmit signal path. The receive signal path of the radio IC circuitry 906a may include at least mixer circuitry 1102, such as, for example, down-conversion mixer circuitry, amplifier circuitry 1106 and filter circuitry 1108. The transmit signal path of the radio IC circuitry 906a may include at least filter circuitry 1112 and mixer circuitry 1114, such as, for example, up-conversion mixer circuitry. Radio IC circuitry 906a may also include synthesizer circuitry 1104 for synthesizing a frequency 1105 for use by the mixer circuitry 1102 and the mixer circuitry 1114. The mixer circuitry 1102 and/or 1114 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 11 illustrates only a simplified version of a radio IC circuitry, and may include, although not shown, embodiments where each of the depicted circuitries may include more than one component. For instance, mixer circuitry 1114 may each include one or more mixers, and filter circuitries 1108 and/or 1112 may each include one or more filters, such as one or more BPFs and/or LPFs according to application needs. For example, when mixer circuitries are of the direct-conversion type, they may each include two or more mixers.

In some embodiments, mixer circuitry 1102 may be configured to down-convert RF signals 1007 received from the FEM circuitry 904a-b (FIG. 9) based on the synthesized frequency 1105 provided by synthesizer circuitry 1104. The amplifier circuitry 1106 may be configured to amplify the down-converted signals and the filter circuitry 1108 may include an LPF configured to remove unwanted signals from the down-converted signals to generate output baseband signals 1107. Output baseband signals 1107 may be provided to the baseband processing circuitry 908a-b (FIG. 9) for further processing. In some embodiments, the output baseband signals 1107 may be zero-frequency baseband signals, although this is not a requirement. In some embodiments, mixer circuitry 1102 may comprise passive mixers, although the scope of the embodiments is not limited in this respect.

In some embodiments, the mixer circuitry 1114 may be configured to up-convert input baseband signals 1111 based on the synthesized frequency 1105 provided by the synthesizer circuitry 1104 to generate RF output signals 1009 for the FEM circuitry 904a-b. The baseband signals 1111 may be provided by the baseband processing circuitry 908a-b and may be filtered by filter circuitry 1112. The filter circuitry 1112 may include an LPF or a BPF, although the scope of the embodiments is not limited in this respect.

In some embodiments, the mixer circuitry 1102 and the mixer circuitry 1114 may each include two or more mixers and may be arranged for quadrature down-conversion and/or up-conversion respectively with the help of synthesizer 1104. In some embodiments, the mixer circuitry 1102 and the mixer circuitry 1114 may each include two or more mixers each configured for image rejection (e.g., Hartley image rejection). In some embodiments, the mixer circuitry 1102 and the mixer circuitry 1114 may be arranged for direct down-conversion and/or direct up-conversion, respectively. In some embodiments, the mixer circuitry 1102 and the mixer circuitry 1114 may be configured for super-heterodyne operation, although this is not a requirement.

Mixer circuitry 1102 may comprise, according to one embodiment: quadrature passive mixers (e.g., for the in-phase (I) and quadrature phase (Q) paths). In such an embodiment, RF input signal 1007 from FIG. 11 may be down-converted to provide I and Q baseband output signals to be transmitted to the baseband processor.

Quadrature passive mixers may be driven by zero and ninety-degree time-varying LO switching signals provided by a quadrature circuitry which may be configured to receive a LO frequency (fLo) from a local oscillator or a synthesizer, such as LO frequency 1105 of synthesizer 1104 (FIG. 11). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1007 (FIG. 10) may comprise a balanced signal, although the scope of the embodiments is not limited in this respect. The I and Q baseband output signals may be provided to low-noise amplifier, such as amplifier circuitry 1106 (FIG. 11) or to filter circuitry 1108 (FIG. 11).

In some embodiments, the output baseband signals 1107 and the input baseband signals 1111 may be analog baseband signals, although the scope of the embodiments is not limited in this respect. In some alternate embodiments, the output baseband signals 1107 and the input baseband signals 1111 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1104 may be a fractional-N synthesizer or a fractional N/N+1 synthesizer, although the scope of the embodiments is not limited in this respect as other types of frequency synthesizers may be suitable. For example, synthesizer circuitry 1104 may be a delta-sigma synthesizer, a frequency multiplier, or a synthesizer comprising a phase-locked loop with a frequency divider. According to some embodiments, the synthesizer circuitry 1104 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1104 may be provided by a voltage controlled oscillator (VCO), although that is not a requirement. A divider control input may further be provided by either the baseband processing circuitry 908*a-b* (FIG. 9) depending on the desired output frequency 1105. In some embodiments, a divider control input (e.g., N) may be determined from a look-up table (e.g., within a Wi-Fi card) based on a channel number and a channel center frequency as determined or indicated by the example application processor 910. The application processor 910 may include, or otherwise be connected to, one of the example security signal converter 101 or the example received signal converter 103 (e.g., depending on which device the example radio architecture is implemented in).

In some embodiments, synthesizer circuitry 1104 may be configured to generate a carrier frequency as the output frequency 1105, while in other embodiments, the output frequency 1105 may be a fraction of the carrier frequency (e.g., one-half the carrier frequency, one-third the carrier frequency). In some embodiments, the output frequency 1105 may be a LO frequency (fLo).

Figure 12:
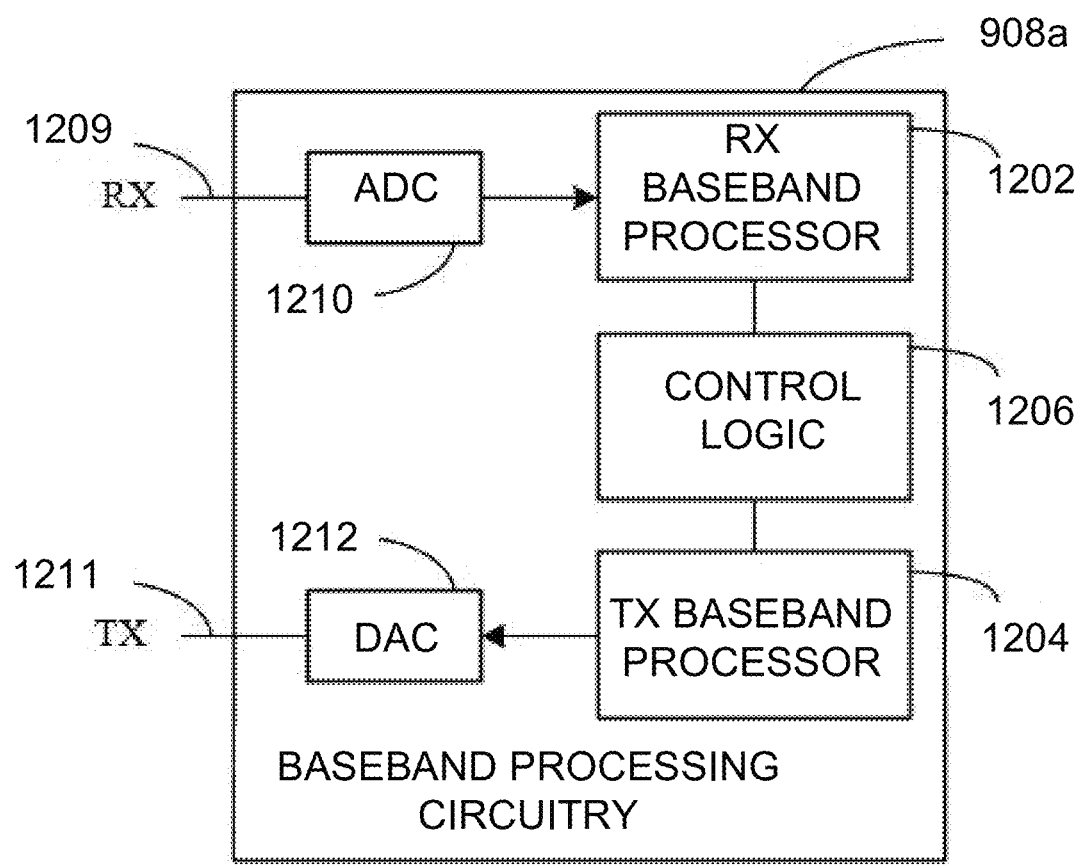
FIG. 12 is a functional block diagram illustrating the baseband processing circuitry of FIG. 9.

FIG. 12 illustrates a functional block diagram of baseband processing circuitry 908*a* in accordance with some embodiments. The baseband processing circuitry 908*a* is one example of circuitry that may be suitable for use as the baseband processing circuitry 908*a* (FIG. 9), although other circuitry configurations may also be suitable. Alternatively, the example of FIG. 11 may be used to implement the example BT baseband processing circuitry 908*b* of FIG. 9.

The baseband processing circuitry 908*a* may include a receive baseband processor (RX BBP) 1202 for processing receive baseband signals 1109 provided by the radio IC circuitry 906*a-b* (FIG. 9) and a transmit baseband processor (TX BBP) 1204 for generating transmit baseband signals 1111 for the radio IC circuitry 906*a-b*. The baseband processing circuitry 908*a* may also include control logic 1206 for coordinating the operations of the baseband processing circuitry 908*a*.

In some embodiments (e.g., when analog baseband signals are exchanged between the baseband processing circuitry 908*a-b* and the radio IC circuitry 906*a-b*), the baseband processing circuitry 908*a* may include ADC 1210 to convert analog baseband signals 1209 received from the radio IC circuitry 906*a-b* to digital baseband signals for processing by the RX BBP 1202. In these embodiments, the baseband processing circuitry 908*a* may also include DAC 1212 to convert digital baseband signals from the TX BBP 1204 to analog baseband signals 1211.

In some embodiments that communicate OFDM signals or OFDMA signals, such as through baseband processor 908*a*, the transmit baseband processor 1204 may be configured to generate OFDM or OFDMA signals as appropriate for transmission by performing an inverse fast Fourier transform (IFFT). The receive baseband processor 1202 may be configured to process received OFDM signals or OFDMA signals by performing an FFT. In some embodiments, the receive baseband processor 1202 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 9, in some embodiments, the antennas 901 (FIG. 9) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 901 may each include a set of phased-array antennas, although embodiments are not so limited.

Although the radio architecture 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

ADDITIONAL NOTES AND EXAMPLES

Example 1 includes a communication device operating under a Very Low Power (VLP) mode. The communication device comprises: processing circuitry, to encode a message to be transmitted to a second communication device, to indicate a setpoint, wherein the setpoint is defined as a minimum power at which a packet is required to be transmitted under a set of packet parameters, such that the packet could be successfully received by the communication device; and a transceiver, to: transmit the message to the second communication device; and receive the packet transmitted at a power determined based on the setpoint and a margin, from the second communication device, wherein the margin is determined based on a probability of measurement errors.

Example 2 includes the communication device of Example 1, wherein the power determined based on the setpoint and the margin is above the setpoint by a quantity not larger than the margin.

Example 3 includes the communication device of Example 2, wherein the processing circuitry is further to: monitor the quantity during communication with the second communication device; and terminate the communication between the communication device and the second communication device, in a case that the quantity is larger than the margin for more than a particular number of packets.

Example 4 includes the communication device of any of Examples 1-3, wherein the set of packet parameters includes at least a Modulation and Coding Scheme (MCS) and a bandwidth (BW).

Example 5 includes the communication device of any of Examples 1-4, wherein the processing circuitry is further to encode a second message to be transmitted to the second communication device, to indicate a set of operating points, each corresponding to a respective set of packet parameters.

Example 6 includes the communication device of any of Examples 1-5, wherein the setpoint is to be updated during each packet exchange, based on a communication configuration, the measurement errors, or channel changes.

Example 7 includes the communication device of Example 6, wherein the processing circuitry is further to encode a frame to be transmitted to the second communication device, to include information for updating the setpoint, and the power for transmitting the packet from the second communication device is to be determined based on the setpoint, the information for updating the setpoint, and the margin.

Example 8 includes the communication device of Example 6, wherein the processing circuitry is further to encode a frame to be transmitted to the second communication device, to include an updated setpoint, and the power for transmitting the packet from the second communication device is to be determined based on the updated setpoint and the margin.

Example 9 includes the communication device of any of Examples 1-8, wherein the processing circuitry is further to encode a frame to be transmitted to the second communication device, to include a power at which the frame is to be transmitted.

Example 10 includes the communication device of any of Examples 1-9, wherein the communication device is a station (STA) and the second communication device is an access point (AP); or the communication device is an AP and the second communication device is a STA.

Example 11 includes the communication device of any of Examples 1-9, wherein the communication device and the second communication device are point to point (P2P) communication devices.

Example 12 includes a communication device operating under a Very Low Power (VLP) mode. The communication device comprises: processing circuitry, to: decode a message received from a second communication device, to obtain a setpoint defined as a minimum power at which a packet is required to be transmitted under a set of packet parameters, such that the packet could be successfully received by the second communication device, and determine a power to be used to transmit the packet to the second communication device, based on the setpoint and a margin, wherein the margin is determined based on a probability of measurement errors; and a transceiver, to transmit the packet to the second communication device at the determined power.

Example 13 includes the communication device of Example 12, wherein the processing circuitry is to determine the power to be used to transmit the packet to the second communication device as being above the setpoint by a quantity not larger than the margin.

Example 14 includes the communication device of Example 13, wherein the processing circuitry is further to: monitor the quantity during communication with the second communication device; and terminate the communication between the communication device and the second communication device, when the quantity is larger than the margin for more than a particular number of packets.

Example 15 includes the communication device of any of Examples 12-14, wherein the set of packet parameters includes at least a Modulation and Coding Scheme (MCS) and a bandwidth (BW).

Example 16 includes the communication device of any of Examples 12-15, wherein the processing circuitry is further to decode a second message received from the second communication device, the second message is to indicate a set of operating points, each corresponding to a respective set of packet parameters.

Example 17 includes the communication device of any of Examples 12-16, wherein the setpoint is to be updated during each packet exchange, based on a communication configuration, the measurement errors and channel changes.

Example 18 includes the communication device of Example 17, wherein the processing circuitry is further to decode a frame including information for updating the setpoint and received from the second communication device, and determining the power to be used to transmit the packet to the second communication device, based on the setpoint, the information for updating the setpoint, and the margin.

Example 19 includes the communication device of Example 17, wherein the processing circuitry is further to decode a frame including the updated setpoint and received from the second communication device, and determining the power to be used to transmit the packet to the second communication device, based on the updated setpoint and the margin.

Example 20 includes the communication device of any of Examples 12-19, wherein the processing circuitry is further to: decode a frame received from the second communication device, wherein the frame has information to indicate a power at which the frame was transmitted; and estimate a path loss based on the indicated power and a received signal strength (RSSI) of the frame.

Example 21 includes the communication device of any of Examples 12-20, wherein the communication device is a station (STA) and the second communication device is an access point (AP); or the communication device is an AP and the second communication device is a STA.

Example 22 includes the communication device of any of Examples 12-20, wherein the communication device and the second communication device are point to point (P2P) communication devices.

Example 23 includes a non-transitory computer-readable storage medium having instructions stored thereon, which when executed by a processor of a communication device operating under a Very Low Power (VLP) mode, cause the communication device to: encode a message to be transmitted to a second communication device, to indicate a setpoint, wherein the setpoint is defined as a minimum power at which a packet is required to be transmitted under a set of packet parameters, such that the packet could be successfully received by the communication device; transmit the message to the second communication device; and receive the packet transmitted at a power determined based on the setpoint and a margin, from the second communication device, wherein the margin is determined based on a probability of measurement errors.

Example 24 includes the non-transitory computer-readable storage medium of Example 23, wherein the power determined based on the setpoint and the margin is above the setpoint by a quantity not larger than the margin.

Example 25 includes the non-transitory computer-readable storage medium of Example 24, wherein the instructions when executed by the processor, further cause the communication device to: monitor the quantity during communication with the second communication device; and terminate the communication between the communication device and the second communication device, in a case that the quantity is larger than the margin for more than a particular number of packets.

Example 26 includes the non-transitory computer-readable storage medium of any of Examples 23-25, wherein the set of packet parameters includes at least a Modulation and Coding Scheme (MCS) and a bandwidth (BW).

Example 27 includes the non-transitory computer-readable storage medium of any of Examples 23-26, wherein the instructions when executed by the processor, further cause the communication device to encode a second message to be transmitted to the second communication device, to indicate a set of operating points, each corresponding to a respective set of packet parameters.

Example 28 includes the non-transitory computer-readable storage medium of any of Examples 23-27, wherein the setpoint is to be updated during each packet exchange, based on a communication configuration, the measurement errors, or channel changes.

Example 29 includes the non-transitory computer-readable storage medium of Example 28, wherein the instructions when executed by the processor, further cause the communication device to encode a frame to be transmitted to the second communication device, to include information for updating the setpoint, and the power for transmitting the packet from the second communication device is to be determined based on the setpoint, the information for updating the setpoint, and the margin.

Example 30 includes the non-transitory computer-readable storage medium of Example 28, wherein the instructions when executed by the processor, further cause the communication device to encode a frame to be transmitted to the second communication device, to include an updated setpoint, and the power for transmitting the packet from the second communication device is to be determined based on the updated setpoint and the margin.

Example 31 includes the non-transitory computer-readable storage medium of any of Examples 23-30, wherein the instructions when executed by the processor, further cause the communication device to encode a frame to be transmitted to the second communication device, to include a power at which the frame is to be transmitted.

Example 32 includes the non-transitory computer-readable storage medium of any of Examples 23-31, wherein the communication device is a station (STA) and the second communication device is an access point (AP); or the communication device is an AP and the second communication device is a STA.

Example 33 includes the non-transitory computer-readable storage medium of any of Examples 23-31, wherein the communication device and the second communication device are point to point (P2P) communication devices.

Example 34 includes a non-transitory computer-readable storage medium having instructions stored thereon, which when executed by a processor of a communication device operating under a Very Low Power (VLP) mode, cause the communication device to: decode a message received from a second communication device, to obtain a setpoint defined as a minimum power at which a packet is required to be transmitted under a set of packet parameters, such that the packet could be successfully received by the second communication device; determine a power to be used to transmit the packet to the second communication device, based on the setpoint and a margin, wherein the margin is determined based on a probability of measurement errors; and transmit the packet to the second communication device at the determined power.

Example 35 includes the non-transitory computer-readable storage medium of Example 34, wherein wherein the instructions when executed by the processor, further cause the communication device to determine the power to be used to transmit the packet to the second communication device as being above the setpoint by a quantity not larger than the margin.

Example 36 includes the non-transitory computer-readable storage medium of Example 35, wherein the instructions when executed by the processor, further cause the communication device to: monitor the quantity during communication with the second communication device; and terminate the communication between the communication device and the second communication device, when the quantity is larger than the margin for more than a particular number of packets.

Example 37 includes the non-transitory computer-readable storage medium of any of Examples 34-36, wherein the set of packet parameters includes at least a Modulation and Coding Scheme (MCS) and a bandwidth (BW).

Example 38 includes the non-transitory computer-readable storage medium of any of Examples 34-37, wherein the instructions when executed by the processor, further cause the communication device to decode a second message received from the second communication device, the second message is to indicate a set of operating points, each corresponding to a respective set of packet parameters.

Example 39 includes the non-transitory computer-readable storage medium of any of Examples 34-38, wherein the setpoint is to be updated during each packet exchange, based on a communication configuration, the measurement errors and channel changes.

Example 40 includes the non-transitory computer-readable storage medium of Example 39, wherein the instructions when executed by the processor, further cause the communication device to decode a frame including information for updating the setpoint and received from the second communication device, and determining the power to be used to transmit the packet to the second communication device, based on the setpoint, the information for updating the setpoint, and the margin.

Example 41 includes the non-transitory computer-readable storage medium of Example 39, wherein the instructions when executed by the processor, further cause the communication device to decode a frame including the updated setpoint and received from the second communication device, and determining the power to be used to transmit the packet to the second communication device, based on the updated setpoint and the margin.

Example 42 includes the non-transitory computer-readable storage medium of any of Examples 34-41, wherein the instructions when executed by the processor, further cause the communication device to: decode a frame received from the second communication device, wherein the frame has information to indicate a power at which the frame was transmitted; and estimate a path loss based on the indicated power and a received signal strength (RSSI) of the frame.

Example 43 includes the non-transitory computer-readable storage medium of any of Examples 34-42, wherein the communication device is a station (STA) and the second communication device is an access point (AP); or the communication device is an AP and the second communication device is a STA.

Example 44 includes the non-transitory computer-readable storage medium of any of Examples 34-42, wherein the communication device and the second communication device are point to point (P2P) communication devices.

Example 45 includes a method to be performed by a communication device operating under a Very Low Power (VLP) mode. The method comprises: encoding a message to be transmitted to a second communication device, to indicate a setpoint, wherein the setpoint is defined as a minimum power at which a packet is required to be transmitted under a set of packet parameters, such that the packet could be successfully received by the communication device; transmitting the message to the second communication device; and receiving the packet transmitted at a power determined based on the setpoint and a margin, from the second communication device, wherein the margin is determined based on a probability of measurement errors.

Example 46 includes the method of Example 45, wherein the power determined based on the setpoint and the margin is above the setpoint by a quantity not larger than the margin.

Example 47 includes method of Example 46, further comprising: monitoring the quantity during communication with the second communication device; and terminating the communication between the communication device and the second communication device, in a case that the quantity is larger than the margin for more than a particular number of packets.

Example 48 includes the method of any of Examples 45-47, wherein the set of packet parameters includes at least a Modulation and Coding Scheme (MCS) and a bandwidth (BW).

Example 49 includes the method of any of Examples 45-48, further comprising encoding a second message to be transmitted to the second communication device, to indicate a set of operating points, each corresponding to a respective set of packet parameters.

Example 50 includes the method of any of Examples 45-49, wherein the setpoint is to be updated during each packet exchange, based on a communication configuration, the measurement errors, or channel changes.

Example 51 includes the method of Example 50, further comprising encoding a frame to be transmitted to the second communication device, to include information for updating the setpoint, and the power for transmitting the packet from the second communication device is to be determined based on the setpoint, the information for updating the setpoint, and the margin.

Example 52 includes the method of Example 50, further comprising encode a frame to be transmitted to the second communication device, to include an updated setpoint, and the power for transmitting the packet from the second communication device is to be determined based on the updated setpoint and the margin.

Example 53 includes the method of any of Examples 45-52, further comprising encode a frame to be transmitted to the second communication device, to include a power at which the frame is to be transmitted.

Example 54 includes the method of any of Examples 45-53, wherein the communication device is a station (STA) and the second communication device is an access point (AP); or the communication device is an AP and the second communication device is a STA.

Example 55 includes the method of any of Examples 45-53, wherein the communication device and the second communication device are point to point (P2P) communication devices.

Example 56 includes an apparatus for a communication device operating under a Very Low Power (VLP) mode, comprising means for performing the method of any of Examples 45-55.

Example 57 includes a method to be performed by a communication device operating under a Very Low Power (VLP) mode. The method comprises: decoding a message received from a second communication device, to obtain a setpoint defined as a minimum power at which a packet is required to be transmitted under a set of packet parameters, such that the packet could be successfully received by the second communication device; determining a power to be used to transmit the packet to the second communication device, based on the setpoint and a margin, wherein the margin is determined based on a probability of measurement errors; and transmitting the packet to the second communication device at the determined power.

Example 58 includes the method of Example 57, further comprising determining the power to be used to transmit the packet to the second communication device as being above the setpoint by a quantity not larger than the margin.

Example 59 includes the method of Example 58, further comprising: monitoring the quantity during communication with the second communication device; and terminating the communication between the communication device and the second communication device, when the quantity is larger than the margin for more than a particular number of packets.

Example 60 includes the method of any of Examples 57-59, wherein the set of packet parameters includes at least a Modulation and Coding Scheme (MCS) and a bandwidth (BW).

Example 61 includes the method of any of Examples 57-60, further comprising decoding a second message received from the second communication device, the second message is to indicate a set of operating points, each corresponding to a respective set of packet parameters.

Example 62 includes the method of any of Examples 57-61, wherein the setpoint is to be updated during each packet exchange, based on a communication configuration, the measurement errors and channel changes.

Example 63 includes the method of Example 62, further comprising decoding a frame including information for updating the setpoint and received from the second communication device, and determining the power to be used to transmit the packet to the second communication device, based on the setpoint, the information for updating the setpoint, and the margin.

Example 64 includes the method of Example 62, further comprising decoding a frame including the updated setpoint and received from the second communication device, and determining the power to be used to transmit the packet to the second communication device, based on the updated setpoint and the margin.

Example 65 includes the method of any of Examples 57-64, further comprising: decoding a frame received from the second communication device, wherein the frame has information to indicate a power at which the frame was transmitted; and estimating a path loss based on the indicated power and a received signal strength (RSSI) of the frame.

Example 66 includes the method of any of Examples 57-65, wherein the communication device is a station (STA) and the second communication device is an access point (AP); or the communication device is an AP and the second communication device is a STA.

Example 67 includes the method of any of Examples 57-65, wherein the communication device and the second communication device are point to point (P2P) communication devices.

Example 68 includes an apparatus for a communication device operating under a Very Low Power (VLP) mode, comprising means for performing the method of any of Examples 57-67.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A communication device, comprising:
   processing circuitry, to encode a message to be transmitted to a second communication device, to indicate a setpoint, wherein the setpoint is defined as a minimum power at which a packet is required to be transmitted under a set of packet parameters, enabling the packet to be successfully received by the communication device; and
   a transceiver, to:
      transmit the message to the second communication device; and
      receive the packet transmitted at a power determined based on the setpoint and a margin, from the second communication device, wherein the margin is determined based on a probability of measurement errors.

2. The communication device of claim 1, wherein the power determined based on the setpoint and the margin is above the setpoint by a quantity not larger than the margin.

3. The communication device of claim 2, wherein the processing circuitry is further to:
  monitor the quantity during communication with the second communication device; and
  terminate the communication between the communication device and the second communication device, in a case that the quantity is larger than the margin for more than a particular number of packets.

4. The communication device of claim 1, wherein the set of packet parameters includes at least a Modulation and Coding Scheme (MCS) and a bandwidth (BW).

5. The communication device of claim 1, wherein the processing circuitry is further to encode a second message to be transmitted to the second communication device, to indicate a set of operating points, each corresponding to a respective set of packet parameters.

6. The communication device of claim 1, wherein the setpoint is to be updated during each packet exchange, based on a communication configuration, the measurement errors, or channel changes.

7. The communication device of claim 6, wherein the processing circuitry is further to encode a frame to be transmitted to the second communication device, to include information for updating the setpoint, and the power for transmitting the packet from the second communication device is to be determined based on the setpoint, the information for updating the setpoint, and the margin.

8. The communication device of claim 6, wherein the processing circuitry is further to encode a frame to be transmitted to the second communication device, to include an updated setpoint, and the power for transmitting the packet from the second communication device is to be determined based on the updated setpoint and the margin.

9. The communication device of claim 1, wherein the processing circuitry is further to encode a frame to be transmitted to the second communication device, to include a power at which the frame is to be transmitted.

10. The communication device of claim 1, wherein the communication device is a station (STA) and the second communication device is an access point (AP); or the communication device is an AP and the second communication device is a STA.

11. The communication device of claim 1, wherein the communication device and the second communication device are point to point (P2P) communication devices.

12. A communication device, comprising:
  processing circuitry, to:
    decode a message received from a second communication device, to obtain a setpoint defined as a minimum power at which a packet is required to be transmitted under a set of packet parameters, enabling the packet to be successfully received by the second communication device; and
    determine a power to be used to transmit the packet to the second communication device, based on the setpoint and a margin, wherein the margin is determined based on a probability of measurement errors; and
  a transceiver, to transmit the packet to the second communication device at the determined power.

13. The communication device of claim 12, wherein the processing circuitry is to determine the power to be used to transmit the packet to the second communication device as being above the setpoint by a quantity not larger than the margin.

14. The communication device of claim 13, wherein the processing circuitry is further to:
  monitor the quantity during communication with the second communication device; and
  terminate the communication between the communication device and the second communication device, when the quantity is larger than the margin for more than a particular number of packets.

15. The communication device of claim 12, wherein the set of packet parameters includes at least a Modulation and Coding Scheme (MCS) and a bandwidth (BW).

16. The communication device of claim 12, wherein the processing circuitry is further to decode a second message received from the second communication device, the second message is to indicate a set of operating points, each corresponding to a respective set of packet parameters.

17. The communication device of claim 12, wherein the setpoint is to be updated during each packet exchange, based on a communication configuration, the measurement errors and channel changes.

18. The communication device of claim 17, wherein the processing circuitry is further to decode a frame including information for updating the setpoint and received from the second communication device, and determining the power to be used to transmit the packet to the second communication device, based on the setpoint, the information for updating the setpoint, and the margin.

19. The communication device of claim 17, wherein the processing circuitry is further to decode a frame including the updated setpoint and received from the second communication device, and determining the power to be used to transmit the packet to the second communication device, based on the updated setpoint and the margin.

20. The communication device of claim 12, wherein the processing circuitry is further to:
  decode a frame received from the second communication device, wherein the frame has information to indicate a power at which the frame was transmitted; and
  estimate a path loss based on the indicated power and a received signal strength (RSSI) of the frame.

21. The communication device of claim 12, wherein the communication device is a station (STA) and the second communication device is an access point (AP); or the communication device is an AP and the second communication device is a STA.

22. The communication device of claim 12, wherein the communication device and the second communication device are point to point (P2P) communication devices.

23. A tangible non-transitory computer-readable storage medium having instructions stored thereon, which when executed by a processor of a communication device, cause the communication device to:
  encode a message to be transmitted to a second communication device, to indicate a setpoint, wherein the setpoint is defined as a minimum power at which a packet is required to be transmitted under a set of packet parameters, enabling the packet to be successfully received by the communication device;
  transmit the message to the second communication device; and
  receive the packet transmitted at a power determined based on the setpoint and a margin, from the second communication device, wherein the margin is determined based on a probability of measurement errors.

24. The tangible non-transitory computer-readable storage medium of claim 23, wherein the power determined based on the setpoint and the margin is above the setpoint by a quantity not larger than the margin.

25. The tangible non-transitory computer-readable storage medium of claim 24, wherein the instructions when executed by the processor, further cause the communication device to:
- monitor the quantity during communication with the second communication device; and
- terminate the communication between the communication device and the second communication device, when the quantity is larger than the margin for more than a particular number of packets.

\* \* \* \* \*